Patented May 21, 1929.

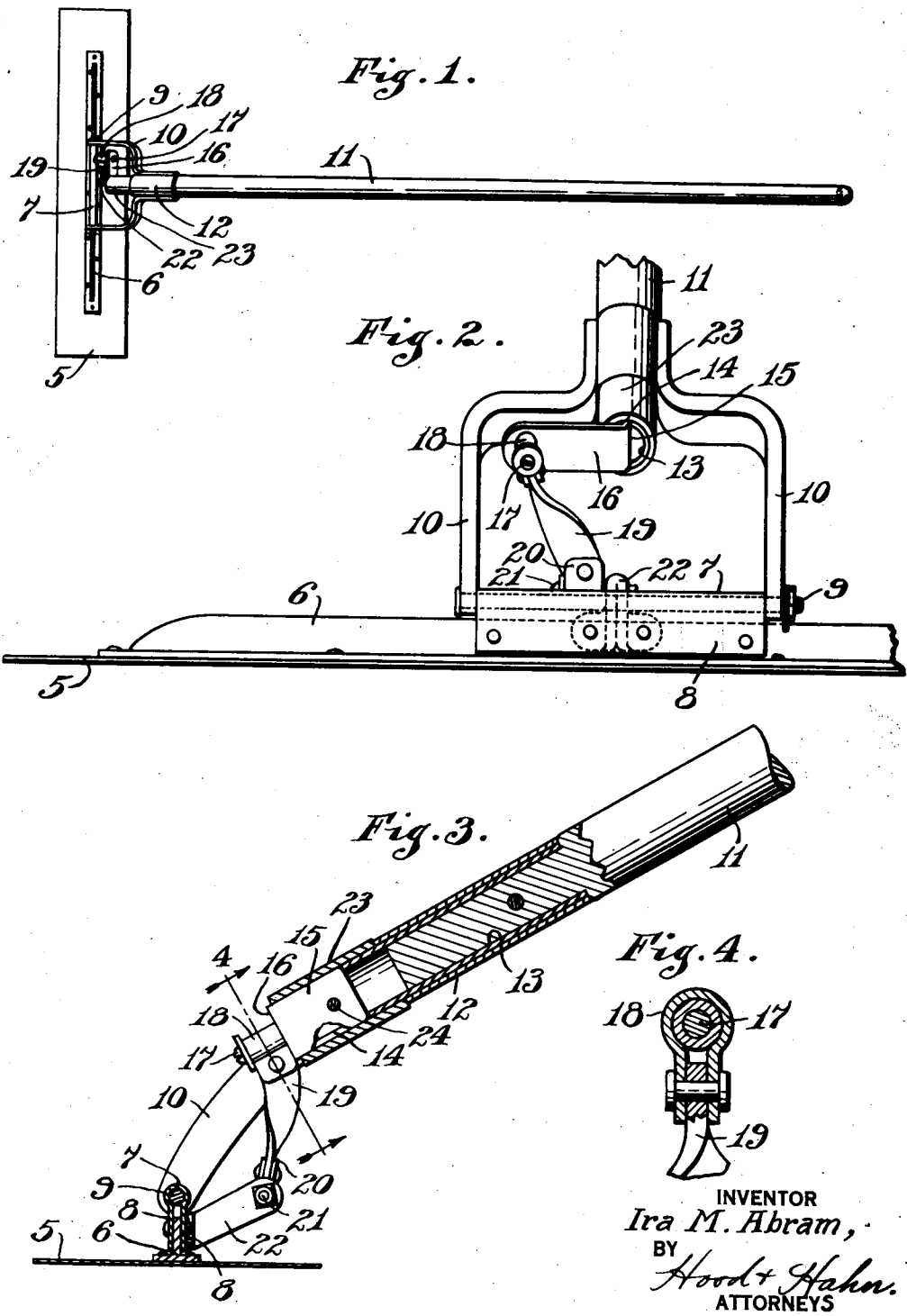

1,713,513

UNITED STATES PATENT OFFICE.

IRA M. ABRAM, OF DUGGER, INDIANA.

SURFACER.

Application filed April 22, 1927. Serial No. 185,691.

My invention relates to surfacing tools and particularly for that class of tools for working plastics, such for instance as cement, plaster, etc., in the proper shape.

One of the objects of my invention is to provide a surfacing tool in which the working face of the tool may be readily tilted to a proper angle relative to the surface being worked upon by means which is easily operated and which permits of cheap and ready manufacture.

I have illustrated one embodiment of the invention in the accompanying drawings in which Fig. 1 is a plan view of a tool embodying my invention;

Fig. 2 is an end view thereof;

Fig. 3 is a longtiudinal section, and

Fig. 4 is a section on the line 4—4 of Fig. 3.

In the embodiment illustrated the surfacing plate 5, which may be a trowel or the like, is provided on its top with a brace bar 6, either formed integrally with the trowel, or secured thereto. This brace bar is provided with a bearing in the form of a sheet metal plate bent upon itself to form the cylindrical bearing portion 7 and the two plate portions 8 which are riveted or otherwise secured to the brace bar 6. This bearing member receives a cross bar 9 extending between the two ears of the yoke 10 to permit a pivotal connection between the trowel and the yoke. A handle 11 is journaled in the barrel 12 of the yoke and rotates on an axis at right angles to the axis of rotation of the yoke on the trowel., This handle 11 is provided with a sleeve 13 secured at its lower end and operating within the barrel 12. The sleeve is slotted at its forward end as at 14 to receive the arm 15 of a crank. The crank is formed of sheet metal so that the insertion of the arm 15 into the slot 14 will cause the crank to rotate with the handle 11. The opposite arm 16 of the crank is provided with a pivot pin 17 which receives a strap 18 connected to a link 19, the link in turn at its opposite end being connected by a similar strap 20 to a pin 21 on an arm 22 secured to the brace bar 6 and extending at an angle to the axis of rotation of the trowel 5. The arrangement is such that the rotation of the handle 11 in barrel 12 will rotate the crank arm 16 and through the link 19 rotate the trowel 5 on the shaft 9 of the yoke and thus tilt the plate 5 in either direction as required by the operator. A collar 23 surrounds the slotted end of the sleeve 13 and assists in maintaining the arm 16 in position in the slots 14. This collar is secured in position by a pin 24 which passes through the collar, through the sleeve and through the arm 15 so that all three of these parts are locked together.

I claim as my invention.

1. A surfacing tool comprising a surfacing plate, a handle yoke hinged to said plate, a rock shaft journaled on the handle yoke at an axis substantially at right angles to the axis of the surfacing plate, a crank arm on said shaft, an arm connected to said plate at an angle to the axis of rotation of said yoke and operating in a plane at right angles to the plane of operation of the crank arm, and a link connecting said arm and crank arm.

2. A surfacing tool comprising a surfacing plate, a handle yoke hinged to said plate, a rock shaft journaled on the handle yoke on an axis substantially at right angles to the axis of the surface plate, a crank arm connected to said rock shaft, an arm connected to said surfacing plate at an angle to the axis thereof and operating in a plane at right angles to the plane of operation of the crank arm, and a link connecting said crank arm and arm and pivotally connected to each.

3. A surfacing tool comprising a surfacing plate, a handle yoke hinged to said plate, a rock shaft journaled on the handle yoke on an axis substantially at right angles to the axis of the surface plate and having a slit in the end thereof, a crank arm comprising a plate having one portion bent at an angle to the other portion and inserted in said slit, an arm on the free end of said crank arm, an arm connected to the surfacing plate at an angle to the axis thereof and a link connecting said arm on the crank arm with said arm on the plate.

4. A surfacing tool comprising a surfacing plate, a handle yoke hinged to said plate, a handle having one end rotatably extending through said yoke and having a slit at its end, a crank arm comprising a plate bent at right angles and having one portion extending into said slit, a sleeve surrounding said handle between said crank arm and the handle yoke, an arm connected to said surfacing plate at an angle to the axis thereof and a link connecting said crank arm and arm.

In witness whereof, I, IRA M. ABRAM, have hereunto set my hand at Dugger, Indiana, this 7th day of April, A. D. 1927.

IRA M. ABRAM.